US006751829B2

United States Patent
Bergstrom

(10) Patent No.: US 6,751,829 B2
(45) Date of Patent: Jun. 22, 2004

(54) TAPE-LESS CABLE CONNECTOR

(76) Inventor: John A Bergstrom, 750 C.J. Moe Blvd., Dassel, MN (US) 55325

( * ) Notice: Subject to any disclaimer, the term of this patent is extended or adjusted under 35 U.S.C. 154(b) by 0 days.

(21) Appl. No.: 10/114,865

(22) Filed: Apr. 1, 2002

(65) Prior Publication Data
US 2003/0182769 A1 Oct. 2, 2003

(51) Int. Cl.[7] .............................. F16G 11/00; B66F 3/00
(52) U.S. Cl. ................ 24/115 H; 24/115 K; 24/115 R; 24/136 R; 24/115 A; 254/134.3 FT
(58) Field of Search ............................... 24/16 R, 17 R, 24/17 A, 17 B, 17 AP, 18, 3.4, 115 H, 115 R, 129 C, 130, 128, 136 R, 115 A, 129 R, 115 K, 115 N; 43/25, 25.1, 43.1; 254/134.3 FT

(56) References Cited

U.S. PATENT DOCUMENTS

| | | | | |
|---|---|---|---|---|
| 1,802,657 A | * | 4/1931 | Kellems | 24/115 R |
| 2,905,995 A | | 9/1959 | Nelson | 24/131 |
| 3,035,817 A | * | 5/1962 | Wilson | 254/134.3 FT |
| 3,102,715 A | * | 9/1963 | Weitzel et al. | 254/134.3 FT |
| 3,192,617 A | * | 7/1965 | Meyer | 29/278 |
| 3,330,533 A | * | 7/1967 | Blume | 254/134.3 FT |
| 3,728,762 A | | 4/1973 | Hogg | 24/129 |
| 3,858,848 A | * | 1/1975 | MacFetrich | 254/134.3 FT |
| 3,979,106 A | * | 9/1976 | Jaques | 254/134.3 FT |
| 3,988,850 A | * | 11/1976 | Steinman | 43/25.2 |
| 4,101,114 A | * | 7/1978 | Martin et al. | 254/134.3 FT |
| 4,411,409 A | * | 10/1983 | Smith | 254/134.3 FT |
| 4,514,004 A | | 4/1985 | Morgan | 294/19.1 |
| 4,529,240 A | | 7/1985 | Engel | 294/141 |
| 4,601,507 A | | 7/1986 | Fallon | 294/86.42 |
| 4,878,653 A | * | 11/1989 | Brown | 254/134.3 FT |
| 4,895,221 A | * | 1/1990 | Carlson | 184/15.1 |
| 5,020,192 A | | 6/1991 | Garlach | 24/136 R |
| 5,863,083 A | * | 1/1999 | Giebel et al. | 294/1.1 |
| 6,023,877 A | * | 2/2000 | Mueller et al. | 43/43.1 |
| 6,257,808 B1 | * | 7/2001 | Groot | 408/1 R |

* cited by examiner

Primary Examiner—Robert J. Sandy
Assistant Examiner—Ruth C. Rodriguez

(57) ABSTRACT

A connector for attaching cable and wire and the like to a cable routing tool. The cable is attached to the connector by feeding the wire or cable through a back loop 4, one of the two loops comprising the device, then past slider 2 through leading loop 3 and back through back loop 4. The cable is secured by pulling in opposite directions loop 3 and the cable. Loop 3 of the connector is hooked to the cable routing tool and the device with the attached cable is pulled or pushed through walls, ceilings or floors as desired. When the cable is in the desired location, the cable may be released quickly by reversing the above attaching procedure.

3 Claims, 1 Drawing Sheet

TAPE-LESS CABLE CONNECTOR

BACKGROUND

1. Field of Invention

This invention is a connector for attaching wire, cable and the like to tools that install, relocate or remove wire, cable and the like, by speeding up the means of connecting and disconnecting the wire or cable without the use of tape, and by holding the cable more securely than current means.

2. Description of Prior Art

The connection of wire and cable and the like to tools utilized in installing, relocating and removing wire and cable and the like is usually done by wrapping the cable around the tool or an opening provided in the tool for this connection and then putting tape around the cable and tool to secure it. The disadvantages of this method are:

(a) Attaching tape is time consuming.
(b) The taped connection is of questionable strength.
(c) The tape is difficult and time consuming to remove.

OBJECTS AND ADVANTAGES

Accordingly, several objects and advantages of the present invention are:

(a) to provide quicker connection of wire, cable and the like to tools for routing the wire or cable through walls, ceilings, and floors;
(b) to more securely attach the wire, cable or the like to tools used for routing the wire or cable through walls, ceilings, and floors; and
(c) to provide quicker disconnection of wire, cable or the like from the tools used for routing the wire or cable through walls, ceilings, and floors;

DRAWING FIGURES

Figure 1:
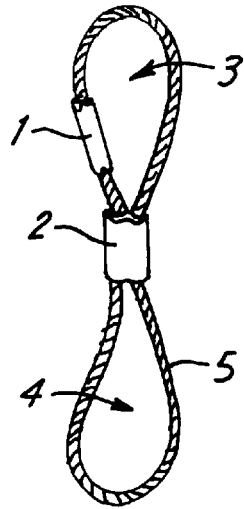
FIG. 1 shows the disclosed invention without the insertion of the wire or cable.

| Reference Numerals in Drawings |
| --- |
| 1 crimped sleeve |
| 2 slider |
| 3 leading loop |
| 4 back loop |
| 5 rope |
| 6 cable |

DESCRIPTION AND OPERATION-FIGS. 1 TO 6

A typical embodiment of the invention is shown in FIG. 1. The preferred material for a rope 5 is wire. Rope 5 is permanently joined together by a sleeve that is crimped, crimped sleeve 1. Rope 5 also has installed on it a sleeve called slider 2 that is not crimped and slides over the wire. Slider 2 forms rope 5 into two loops: leading loop 3 and back loop 4, which resembles a figure eight, except that one strand of rope 5 does not cross over the other strand inside slider 2 but rather the strands are beside each other in slider 2.

Figure 2:
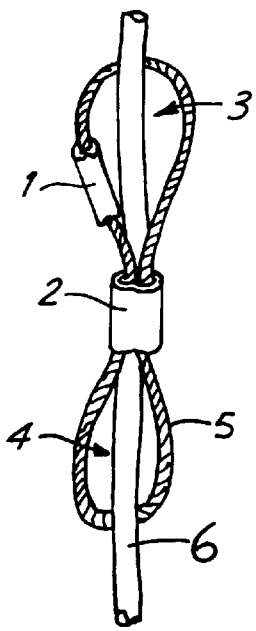
FIG. 2 shows the disclosed invention with the partial insertion of the wire or cable.

FIG. 2 shows the loose end of a cable 6 being inserted first though back loop 4 and then through leading loop 3 past slider 2. Cable 6 could be any type of cable or wire, including telephone, computer, alarm, electric, or the like.

Figure 3:
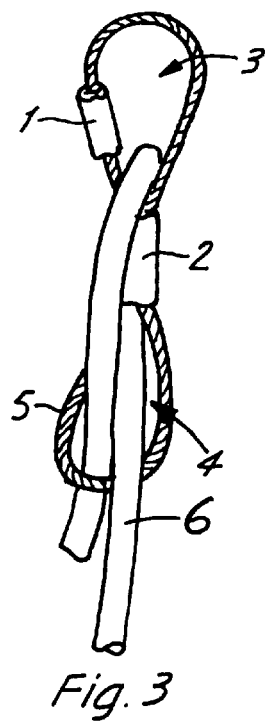
FIG. 3 shows the disclosed invention with the complete insertion of the wire or cable.

FIG. 3 shows the loose end of cable 6 bent 180 degrees around slider 2 and then threaded back into back loop 4.

Figure 4:
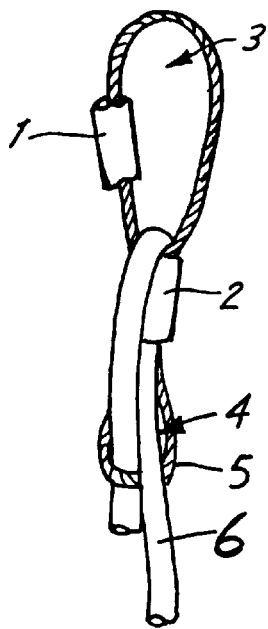
FIG. 4 shows the disclosed invention with the wire or cable securely attached to the device by pulling the slider against the wire or cable.

FIG. 4 shows the tightening of the disclosed invention by pulling leading loop 3 and cable 6 in opposite directions, which causes slider 2 to move toward back loop 4, causing cable 6 to be gripped by the "V" formed at the base of leading loop 3 and slider 2. The harder the pull of cable 6 and leading loop 3, the tighter cable 6 is gripped.

Leading loop 3 is attached to a tool that installs, removes or relocates wire, cable or the like.

To disconnect cable 6, reverse the above procedure and cable 6 is disconnected.

Figure 5:
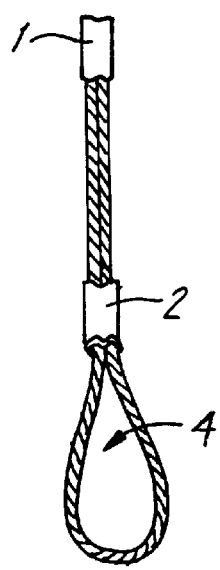
FIGS. 5 and 6 are two variations of the disclosed invention showing the attachment of the two ends of the loop material into the same side of the crimped sleeve but at different locations.
Figure 6:
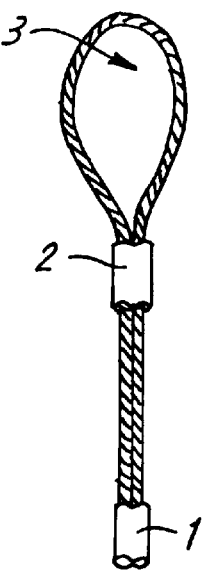

FIGS. 5 and 6 are alternate configurations of the disclosed invention wherein the ends of rope 5 are inserted into crimped sleeve 1 from the same side. FIG. 5 shows crimped sleeve 1 located at the top of leading loop 3; pushing crimped sleeve 1 towards slider 2 makes leading loop 3. FIG. 6 shows crimped sleeve 1 at the bottom of back loop 4; pushing crimped sleeve 1 towards slider 2 makes back loop 4. The descriptions and operations for these alternate configurations is the same as described above for FIGS. 1 thru 4.

SUMMARY, RAMIFICATIONS, AND SCOPE

Accordingly, the reader will see that the disclosed invention will save time connecting and disconnecting wire, cable and the like to routing tools. Tape is not necessary in using the disclosed invention. Wire and cable, regardless of size, will be held more securely to a cable routing tool.

I claim:

1. A connector for easily and securely attaching and unattaching cable or wire to a cable routing tool, comprising:

a. a flexible non-elastic material permanently joined into one continuous piece and shaped into two loops by a slider, which slider is capable of sliding forward and aft to make the loops larger or smaller,
   b. one loop of the flexible non-elastic material attached to the cable routing tool, and
   c. the cable or wire held securely by insertion through both loops wherein the connector pulls or pushes the cable or wire through walls, ceilings or floors of a building.

2. The connector of claim 1 wherein the flexible non-elastic material is wire rope and one end of the wire rope is permanently joined to the other end by a crimped sleeve.

3. The connector of claim 1 wherein the flexible non-elastic material is wire rope and the two ends of the wire rope are permanently joined together by a crimped sleeve.

* * * * *